US 9,246,944 B1

(12) United States Patent
Chen

(10) Patent No.: US 9,246,944 B1
(45) Date of Patent: Jan. 26, 2016

(54) SYSTEMS AND METHODS FOR ENFORCING DATA LOSS PREVENTION POLICIES ON MOBILE DEVICES

(71) Applicant: Symantec Corporation, Mountain View, CA (US)

(72) Inventor: Joseph Chen, Los Angeles, CA (US)

(73) Assignee: Symantec Corporation, Mountain View, CA (US)

(*) Notice: Subject to any disclaimer, the term of this patent is extended or adjusted under 35 U.S.C. 154(b) by 71 days.

(21) Appl. No.: 13/903,994

(22) Filed: May 28, 2013

(51) Int. Cl.
H04L 29/06 (2006.01)
G06F 21/60 (2013.01)
G06F 21/62 (2013.01)

(52) U.S. Cl.
CPC .............. H04L 63/20 (2013.01); G06F 21/604 (2013.01); G06F 21/6218 (2013.01); H04L 63/102 (2013.01)

(58) Field of Classification Search
CPC ... H04L 63/20; H04L 63/102; H04L 63/0277; G06F 21/604; G06F 21/6218
USPC .............................................................. 726/1
See application file for complete search history.

(56) References Cited

U.S. PATENT DOCUMENTS

| | | | | |
|---|---|---|---|---|
| 7,617,532 B1* | 11/2009 | Alexander et al. | | 726/22 |
| 7,991,747 B1* | 8/2011 | Upadhyay | | G06F 11/004 707/674 |
| 8,060,596 B1* | 11/2011 | Wootton | | G06F 15/16 709/223 |
| 8,161,522 B1* | 4/2012 | Agrawal | | 726/1 |
| 8,286,253 B1* | 10/2012 | Lu et al. | | 726/26 |
| 8,321,560 B1* | 11/2012 | Pai et al. | | 709/224 |
| 8,495,705 B1* | 7/2013 | Verma et al. | | 726/2 |
| 8,544,060 B1* | 9/2013 | Khetawat | | H04L 63/20 713/165 |
| 8,638,939 B1* | 1/2014 | Casey et al. | | 380/277 |
| 8,726,396 B1* | 5/2014 | Dodke | | G06F 21/552 726/1 |
| 8,800,031 B2* | 8/2014 | Cecil | | G06F 21/554 726/1 |
| 8,869,235 B2* | 10/2014 | Qureshi | | H04L 63/20 713/150 |
| 2009/0049554 A1* | 2/2009 | Vuong et al. | | 726/26 |
| 2010/0162347 A1* | 6/2010 | Barile | | 726/1 |
| 2010/0169951 A1* | 7/2010 | Vaughan et al. | | 726/3 |
| 2011/0055563 A1* | 3/2011 | Chandran et al. | | 713/168 |
| 2011/0109264 A1* | 5/2011 | Choi | | 320/108 |
| 2011/0131279 A1* | 6/2011 | Karnik | | G06Q 10/107 709/206 |
| 2012/0101870 A1* | 4/2012 | Gates et al. | | 705/7.28 |
| 2012/0131012 A1* | 5/2012 | Taylor | | G06Q 10/00 707/748 |
| 2012/0137375 A1* | 5/2012 | Ramachandran et al. | | 726/28 |
| 2012/0150773 A1* | 6/2012 | DiCorpo et al. | | 706/12 |
| 2012/0159565 A1* | 6/2012 | Bray et al. | | 726/1 |

(Continued)

*Primary Examiner* — Harunur Rashid
*Assistant Examiner* — Shahriar Zarrineh
(74) *Attorney, Agent, or Firm* — ALG Intellectual Property, LLC

(57) ABSTRACT

A computer-implemented method for enforcing data loss prevention policies on mobile devices may include (1) identifying a mobile device that connected to a network and that may include sensitive data and that is in a predetermined state that is designated for transferring data for data loss prevention analysis, (2) requesting, from a data loss prevention policy database via the network, a data loss prevention policy category for the sensitive data based on an analysis the sensitive data, (3) receiving the data loss prevention policy category, tagging, based on the data loss prevention policy category, the sensitive data on the mobile device with a data loss prevention policy tag and (4) enforcing on the mobile device, based on the data loss prevention policy tag, a data loss prevention rule for the data loss prevention category of the sensitive data. Various other methods, systems, and computer-readable media are also disclosed.

20 Claims, 7 Drawing Sheets

(56) References Cited

U.S. PATENT DOCUMENTS

| | | | |
|---|---|---|---|
| 2013/0031595 A1* | 1/2013 | Nevstruev | G06F 21/6245 726/1 |
| 2013/0046995 A1* | 2/2013 | Movshovitz | H04L 9/0618 713/189 |
| 2013/0061284 A1* | 3/2013 | Berengoltz et al. | 726/1 |
| 2013/0110992 A1* | 5/2013 | Ravindra et al. | 709/220 |
| 2013/0174213 A1* | 7/2013 | Liu et al. | 726/1 |
| 2013/0219177 A1* | 8/2013 | Lee et al. | 713/166 |
| 2013/0246465 A1* | 9/2013 | Cambridge et al. | 707/781 |
| 2014/0007183 A1* | 1/2014 | Qureshi | G06F 21/10 726/1 |
| 2014/0053229 A1* | 2/2014 | Saib | 726/1 |
| 2014/0095868 A1* | 4/2014 | Korthny | G06F 21/6218 713/165 |
| 2014/0165137 A1* | 6/2014 | Balinsky et al. | 726/1 |
| 2014/0304197 A1* | 10/2014 | Jaiswal et al. | 706/12 |
| 2015/0249687 A1* | 9/2015 | O'Hare et al. | H04L 9/085 726/3 |

* cited by examiner

SYSTEMS AND METHODS FOR ENFORCING DATA LOSS PREVENTION POLICIES ON MOBILE DEVICES

BACKGROUND

Corporate networks are often filled with sensitive data in the form of confidential emails, company-private documents, personally identifying information, financial information, and more. The sensitive data may be spread across dozens or even hundreds of servers and/or personal computers. Ensuring that this data is kept secure may be very important for both a company's reputation and for its success. Companies may have data loss prevention ("DLP") policies to ensure that sensitive data is handled correctly. Now that sensitive data can be stored not only on devices on the company's intranet but also on the mobile devices of company employees, enforcing DLP policies has become more difficult than ever.

Many traditional systems for enforcing DLP may not be designed with mobile devices in mind. Some traditional systems that do apply to mobile devices may have problems enforcing DLP policies in real-time due to the need to check with a server whenever an action triggering a DLP policy decision takes place. Other traditional systems may be constrained by the limitations of mobile devices which may have limited amounts of processing power and/or battery charge. Accordingly, the instant disclosure identifies and addresses a need for additional and improved systems and methods for enforcing data loss prevention policies on mobile devices.

SUMMARY

As will be described in greater detail below, the instant disclosure generally relates to systems and methods for enforcing data loss prevention policies on mobile devices by identifying a mobile device with sensitive data that may be on a network and/or charging, requesting and receiving a data loss prevention category for the sensitive data, tagging the sensitive data based on the data loss prevention category, and enforcing a data loss prevention rule based on the tag.

In one example, a computer-implemented method for enforcing data loss prevention policies on mobile devices may include (1) identifying a mobile device that may be connected to a network and that may include sensitive data and that may be in a predetermined state that may be designated for transferring data for data loss prevention analysis, (2) requesting, from a data loss prevention policy database via the network, a data loss prevention policy category for the sensitive data on the mobile device based on an analysis of at least a portion of the sensitive data at the data loss prevention policy database, (3) receiving, from the data loss prevention policy database via the network, the data loss prevention policy category for the sensitive data on the mobile device, (4) tagging, based on the data loss prevention policy category, the sensitive data on the mobile device with a data loss prevention policy tag, and (5) enforcing on the mobile device, based on the data loss prevention policy tag, a data loss prevention rule for the data loss prevention category of the sensitive data.

In one embodiment, the computer-implemented method may further include (1) performing, at the data loss prevention policy database, the analysis of the portion of the sensitive data and (2) determining, based on the analysis, the data loss prevention policy category for the sensitive data.

In some examples, the computer-implemented method may further include expiring the data loss prevention policy tag after a predetermined time span.

In one embodiment, the predetermined state may include a charging state.

In one embodiment, the network may include a predetermined type of network that may be designated for transferring data for data loss prevention analysis.

In some examples, enforcing the data loss prevention rule may include enforcing the data loss prevention rule when the mobile device may be not connected to the network.

In some examples, enforcing the data loss prevention rule may include (1) identifying an attempt to transfer the sensitive data and (2) preventing the attempt to transfer the sensitive data without communicating with the data loss prevention policy database after identifying the attempt and before preventing the attempt. In some examples, enforcing the data loss prevention rule may include (1) identifying an attempt to read the sensitive data and (2) blocking the attempt to read the sensitive data without communicating with the data loss prevention policy database after identifying the attempt and before preventing the attempt. In some examples, enforcing the data loss prevention rule may include allowing access to the sensitive data.

In one embodiment, a system for implementing the above-described method may include (1) an identification module that identifies a mobile device that may be connected to a network and that may include sensitive data and that may be in a predetermined state that may be designated for transferring data for data loss prevention analysis, (2) a request module that requests, from a data loss prevention policy database via the network, a data loss prevention policy category for the sensitive data on the mobile device based on an analysis of at least a portion of the sensitive data at the data loss prevention policy database, (3) a receiving module that receives, from the data loss prevention policy database via the network, the data loss prevention policy category for the sensitive data on the mobile device, (4) a tagging module that tags, based on the data loss prevention policy category, the sensitive data on the mobile device with a data loss prevention policy tag, (5) an enforcing module that enforces on the mobile device, based on the data loss prevention policy tag, a data loss prevention rule for the data loss prevention category of the sensitive data, and (6) at least one processor configured to execute the identification module, the request module, the receiving module, the tagging module and the enforcing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a mobile device that is connected to a network and that includes sensitive data and that is in a predetermined state that is designated for transferring data for data loss prevention analysis, (2) request, from a data loss prevention policy database via the network, a data loss prevention policy category for the sensitive data on the mobile device based on an analysis of at least a portion of the sensitive data at the data loss prevention policy database, (3) receive, from the data loss prevention policy database via the network, the data loss prevention policy category for the sensitive data on the mobile device, (4) tag, based on the data loss prevention policy category, the sensitive data on the mobile device with a data loss prevention policy tag, and (5) enforce on the mobile device, based on the data loss prevention policy tag, a data loss prevention rule for the data loss prevention category of the sensitive data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
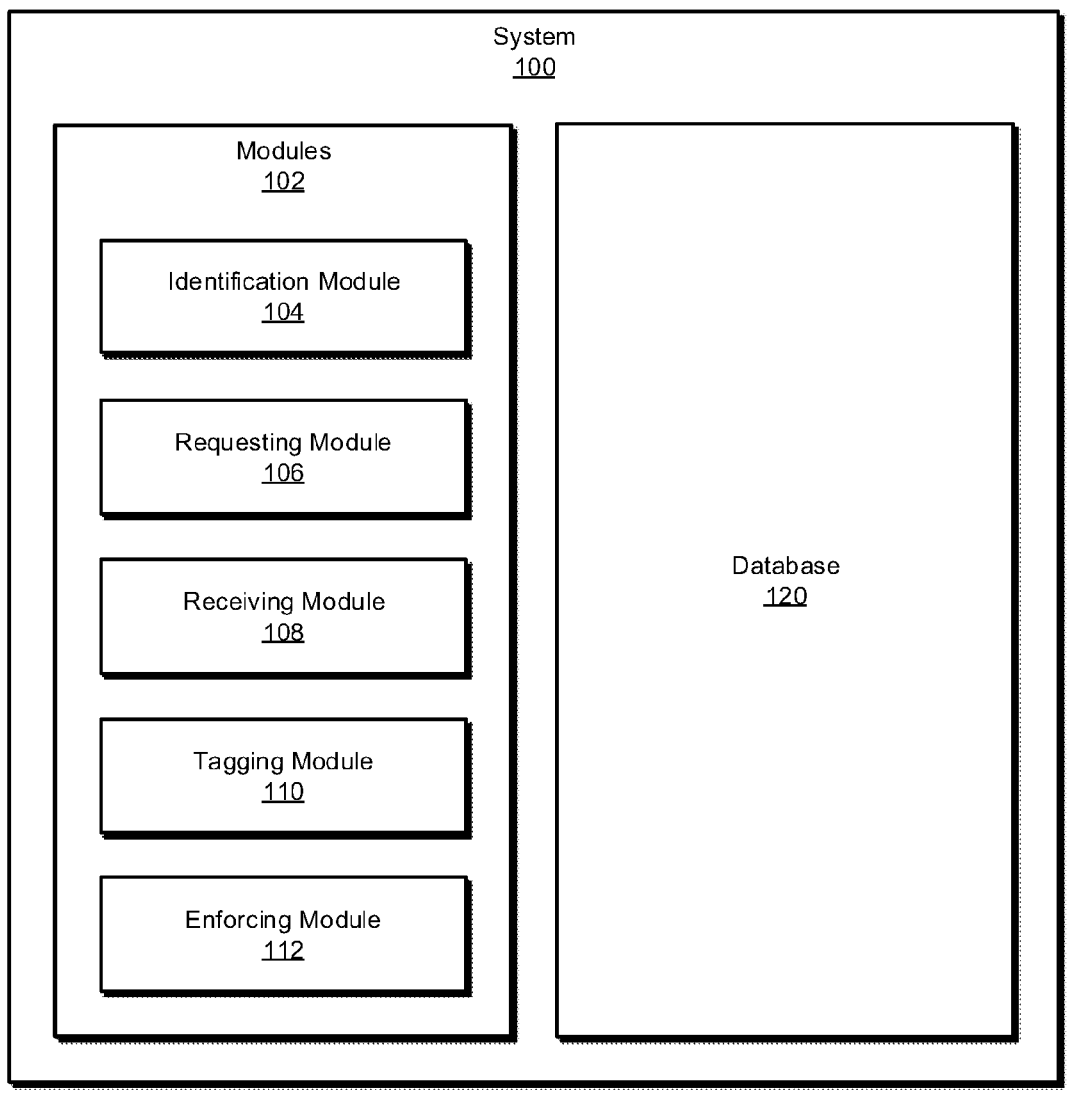
FIG. 1 is a block diagram of an exemplary system for enforcing data loss prevention policies on mobile devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for enforcing data loss prevention policies on mobile devices. As will be explained in greater detail below, tagging sensitive data on a mobile device and enforcing DLP rules based on the tags may allow for highly accurate real-time DLP enforcement by eliminating the need to reference a database on demand. Systems described herein may also save power by performing the tagging process while the mobile device may be charging.

Figure 2:
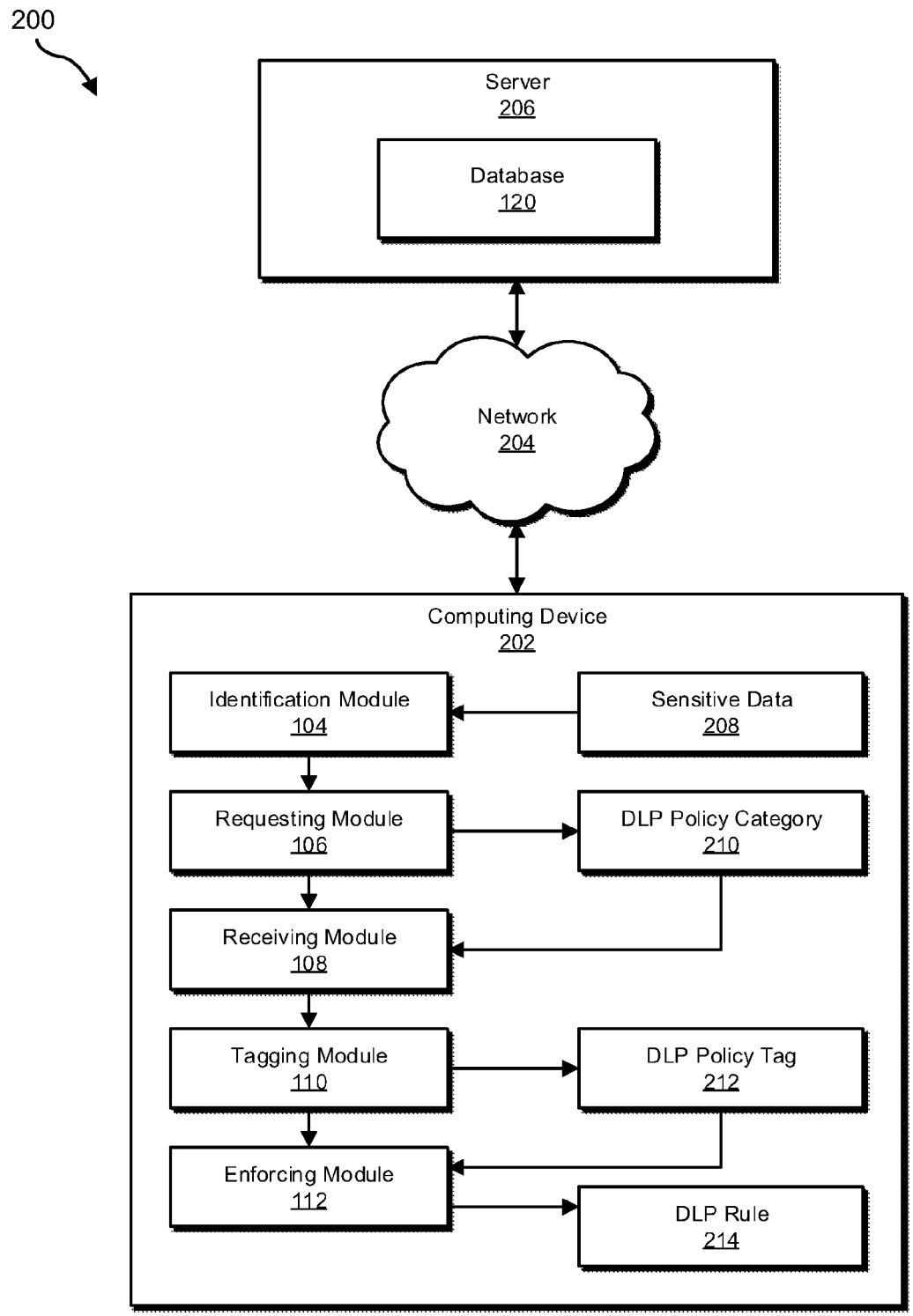
FIG. 2 is a block diagram of an exemplary system for enforcing data loss prevention policies on mobile devices.
Figure 3:
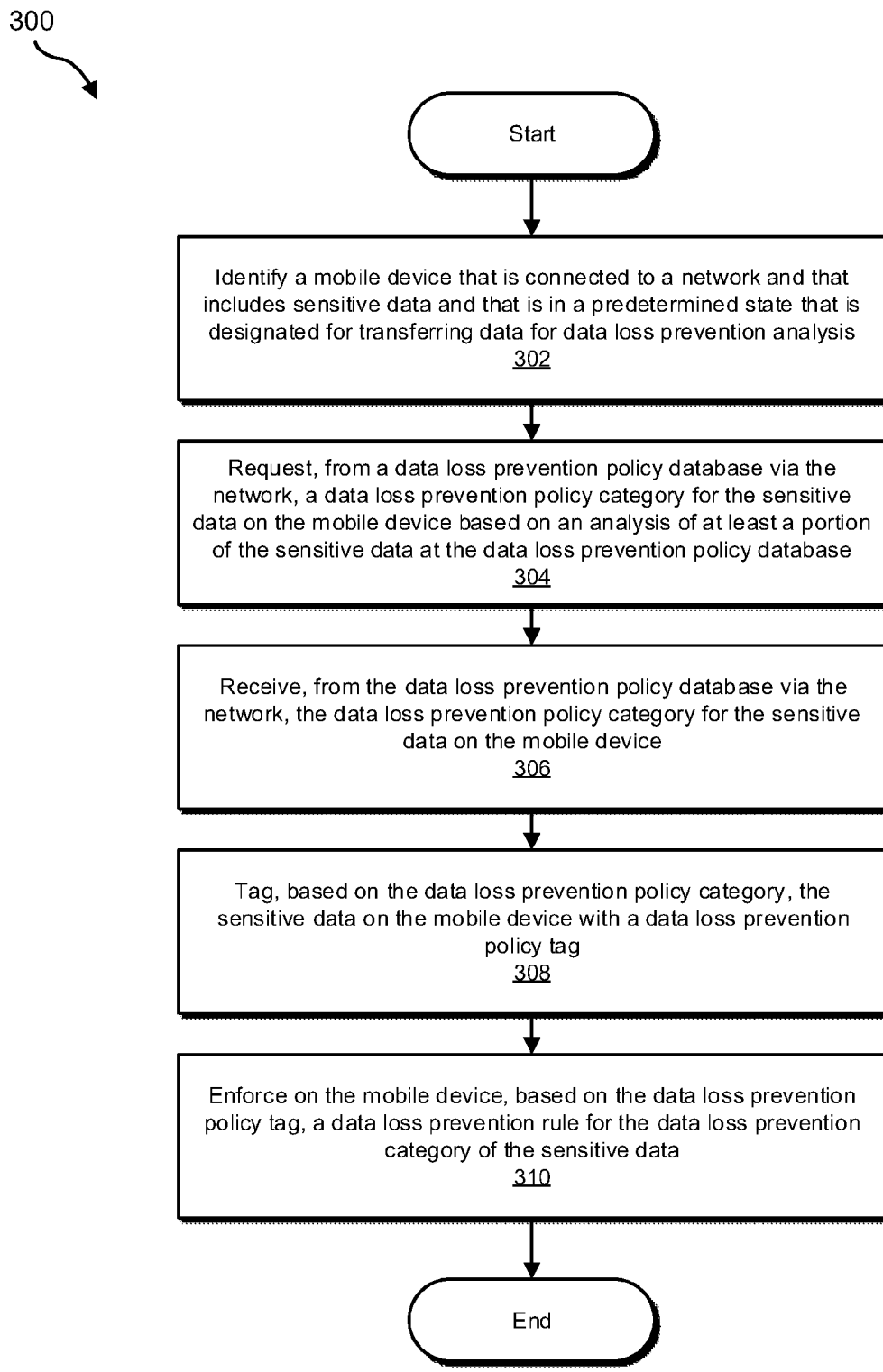
FIG. 3 is a flow diagram of an exemplary method for enforcing data loss prevention policies on mobile devices.
Figure 4:
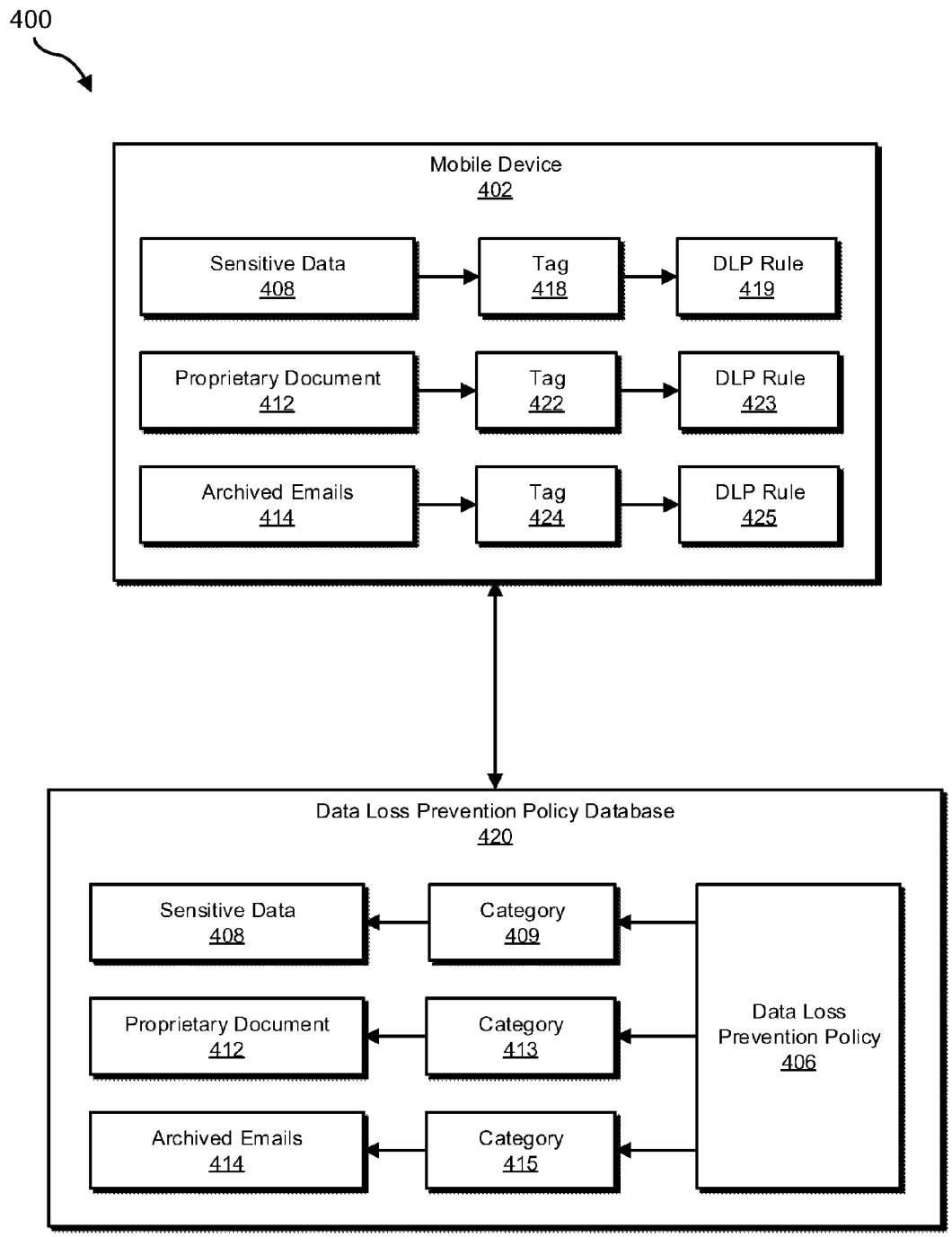
FIG. 4 is a block diagram of an exemplary system for enforcing data loss prevention policies on mobile devices.

The following will provide, with reference to FIGS. 1-2 and 4, detailed descriptions of exemplary systems for enforcing data loss prevention policies on mobile devices. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for enforcing data loss prevention policies on mobile devices. As illustrated in this figure, exemplary system 100 may include one or more modules 102 for performing one or more tasks. For example, and as will be explained in greater detail below, exemplary system 100 may also include an identification module 104 that may identify a mobile device that may be connected to a network and that may include sensitive data and that may be in a predetermined state that may be designated for transferring data for data loss prevention analysis. Exemplary system 100 may additionally include a request module 106 that may request, from a database 120 via the network, a data loss prevention policy category for the sensitive data on the mobile device based on an analysis of at least a portion of the sensitive data at database 120. Exemplary system 100 may also include a receiving module 108 that may receive, from database 120 via the network, the data loss prevention policy category for the sensitive data on the mobile device. Exemplary system 100 may additionally include a tagging module 110 that may tag, based on the data loss prevention policy category, the sensitive data on the mobile device with a data loss prevention policy tag. Exemplary system 100 may also include an enforcing module 112 that may enforce on the mobile device, based on the data loss prevention policy tag, a data loss prevention rule for the data loss prevention category of the sensitive data. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store data loss prevention policy information.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, facilitate computing device 202 and/or server 206 in enforcing data loss prevention policies on mobile devices. For example, and as will be described in greater detail below, one or more of modules 102 may cause computing device 202 and/or server 206 to enforcing data loss prevention policies on mobile devices. For example, and as will be described in greater detail below, identification module 104 may be programmed to identify a mobile device (e.g., computing device 202) that may be connected to network 204 and that may include sensitive data 208 and that may be in a predetermined state that may be designated for transferring data for data loss prevention analysis. Request module 106 may be programmed to request, from a database 120 via network 204, a data loss prevention policy category for sensitive data 208 on the mobile device based on an analysis of at least a portion of sensitive data 208 at database 120. Receiving module 108 may be programmed to receive, from database 120 via network 204, DLP policy category 210 for sensitive data 208 on the mobile device. Tagging module 110 may be programmed to tag, based on DLP policy category 210, sensitive data 208 on the mobile device with DLP policy tag 214. Enforcing module 112 may be programmed to enforce on computing device 202, based on DLP policy tag 212, DLP rule 214 for DLP category 210 of sensitive data 208.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that may be capable of storing and/or processing data loss prevention policy information. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wireless local area network (WLAN), a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for enforcing data loss prevention policies on mobile devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a mobile device that is connected to a network and that may include sensitive data and that is in a predetermined state that is designated for transferring data for data loss prevention analysis. For example, at step 302 identification module 104 may, as part of computing device 202 in FIG. 2, identify a mobile device that is connected to a network 204 and that may include sensitive data 208 and that is in a predetermined state that is designated for transferring data for data loss prevention analysis.

Identification module 104 may identify the mobile device in any of a variety of contexts. For example, identification module 104 may identify a mobile device that may be connected to a wireless network and may be charging. In this example, the mobile device may be storing sensitive data that may be subject to a company's DLP policy.

In one example, identification module 104 may identify a smartphone that may be attached to a charger and may be on a company private Wi-Fi network. The smartphone may have company confidential files, such as documents including the credit card information of customers.

Identification module 104 may identify the mobile device in any suitable manner. For example, identification module 104 may identify the mobile device by executing on the mobile device. Additionally or alternatively, identification module 104 may identify the mobile device by identifying one or more files on the mobile device subject to data loss prevention and/or potentially subject to one or more data loss prevention policies and/or rules.

As used herein, the phrase "data loss prevention" generally refers to any system designed to detect and/or prevent potential data breaches. DLP systems may act on data which may be in use, in motion, and/or at rest. DLP systems may include policies about the storage and/or transmission of data, software configured to enforce DLP policies, physical enforcement of DLP policies, and/or hardware modifications that may prevent the transmission of data. Examples of DLP policies may include, without limitation, "financial information may not be accessed on mobile devices," "company private data may not be copied to movable storage media," "personally identifying information may not be emailed," and/or "all confidential data must be encrypted." Examples of DLP enforcement may include, without limitation, preventing write requests to portable storage media, filtering outgoing emails to detect sensitive data, preventing access to sensitive data while devices are on unsecured networks, and/or encrypting data on computing devices.

In some examples, the predetermined state may include a state of charging. Examples of a charging state may include, without limitation, connection to a mobile device charger, connection to a personal computing device, connection to a wall outlet, and/or inductive coupling with an inductive charging device. In some examples, the charging state may include a state of full charge and in which the mobile devices draws power from a source other than a primary battery of the mobile device. For example, systems described herein may continue to perform the described steps even if the device may have completed charging and may have a full battery. In some examples, the predetermined state may include a state of being attached to a predetermined type of network.

In some examples, the network may include a predetermined type of network that may be designated for transferring data for data loss prevention analysis. The predetermined type of network may include any of a variety of network types and/or characteristics. For example, the predetermined type of network may include a network with a large bandwidth (e.g., a LAN connection rather than a mobile data network) and/or a network with high or no data usage caps. In some examples, identification module 104 may identify that the network is the predetermined type of network based at least in part on a connection type to the network. For example, identification module 104 may determine that a Wi-Fi connection, a USB connection, and/or a BLUETOOTH connection to a network includes and/or is more likely to represent the predetermined type of network as opposed to a mobile telecommunications network (e.g., a 3G connection). For example, the network may be a company intranet that the mobile device may connect to via a wireless network connection.

At step 304 one or more of the systems described herein may request, from a data loss prevention policy database via the network, a data loss prevention policy category for the sensitive data on the mobile device based on an analysis of at least a portion of the sensitive data at the data loss prevention policy database. For example, at step 304 request module 106 may, as part of computing device 202 in FIG. 2, request, from a database 120 via network 204, a data loss prevention policy category (e.g., DLP policy category) for sensitive data 208 on the mobile device based on an analysis of at least a portion of sensitive data 208 at the database 120.

Request module 106 may request the DLP category in any of a variety of ways. For example, request module 106 may request a DLP category by sending a portion of the sensitive data on the mobile device to a DLP policy database via a wireless network. In one example, request module 106 may use the Wi-Fi network to send the sensitive files on the smartphone to a DLP policy database for categorization. In one example, request module 106 may use the Wi-Fi network to send the file names and metadata of the sensitive files to a DLP policy database for categorization.

In some examples, request module 106 may send the entirety of the sensitive data to the DLP policy database. In some examples, request module 106 may send a portion of the sensitive data. For example, request module 106 may send the file name, file headers, a portion of the contents of the file, and/or a hash representing the file to the DLP policy database.

In some embodiments, systems described herein may perform, at the data loss prevention policy database, the analysis of the portion of the sensitive data, and/or determine, based on the analysis, the data loss prevention policy category for the sensitive data. For example, the DLP database may run a regular expression against the sensitive data and may categorize the data based on whether or not it matches the regular expression. In another example, the DLP database may examine the structure of the sensitive data to determine the category. In one example, the DLP database may search the sensitive data for a particular string or set of strings in order to categorize the sensitive data.

At step 306 one or more of the systems described herein may receive, from the data loss prevention policy database via the network, the data loss prevention policy category for the sensitive data on the mobile device. For example, at step 306 receiving module 108 may, as part of computing device 202 in FIG. 2, receive, from the database 120 via network 204, DLP policy category 210 for sensitive data 208 on the mobile device.

Receiving module 108 may receive the DLP category in any suitable manner. For example, receiving module 108 may receive, via the wireless network, the DLP category for the sensitive data from the DLP policy database. In some examples, the DLP category may be based on the data type of the data. Examples of data types include, without limitation, credit card information, company-private information, confidential information, personally identifying information, and/or trade secrets. In some examples, the DLP category may be based on the type of risk caused by potential loss of the data. Examples of types of risk include but are not limited to identity theft, fraud, corporate espionage and/or breaches of confidentiality. In some examples, the DLP category may be based on the DLP rule for the data. Examples of DLP rules include, without limitation, "do not transmit," "do not write to portable storage media," and/or "do not read."

In some examples, receiving module 108 may receive multiple categories for the sensitive flies. The sensitive files may fall under multiple different DLP rules, and/or may include multiple types of sensitive data. For example, the sensitive files may have categories "personally identifying information" and/or "financial information."

In one example, receiving module 108 may receive the category "identity theft risk" for the sensitive files including credit card information. The smartphone may receive the category from the DLP policy database via the Wi-Fi. Additionally or alternatively, receiving module 108 may receive the category "do not transmit" for the sensitive files including credit card information. The smartphone may receive the category from the DLP policy database via the Wi-Fi.

At step 308 one or more of the systems described herein may tag, based on the data loss prevention policy category, the sensitive data on the mobile device with a data loss prevention policy tag. For example, at step 308 tagging module 110 may, as part of computing device 202 in FIG. 2, tag, based on DLP policy category 210, sensitive data 208 on computing device 202 with DLP policy tag 212.

Tagging module 110 may tag the sensitive data in any suitable manner. For example, tagging module 110 may tag the sensitive data on the mobile device with a tag determined by the DLP category received from the DLP policy database.

In one example, tagging module 110 may tag the documents including credit card data with the tag "identity theft risk" based on the category "identity theft risk." As another example, tagging module 110 may tag the documents including credit card data with the tag "do not transmit" based on the category "do not transmit." In an additional example, tagging module 110 may tag the documents including credit card data with the tag "credit card data" based on the category "credit card data."

In some examples, the tag may be different than the category. For example, tagging module 110 may tag the sensitive data with the tag "identity theft risk" based on the category "credit card information." In one example, tagging module 110 may tag the sensitive data with the tag "do not transmit" based on the category "identity theft risk."

FIG. 4 is a block diagram of an exemplary computing system 400 for enforcing data loss prevention policies on mobile devices. DLP policy database 420 may include DLP policy 406. DLP policy 406 may apply categories 409, 413 and/or 415 to sensitive data 408, proprietary document 412, and/or archived emails 414, respectively. Based on these categories, mobile device 402 may apply tags 418, 422 and/or 424 to sensitive data 408, proprietary document 412, and/or archived emails 414, respectively. Based on tags 418, 422 and/or 424, systems described herein may enforce DLP rules 419, 423 and/or 425, respectively, on sensitive data 408, proprietary document 412, and/or archived emails 414.

For example, the DLP policy database may include a DLP policy that may include the rules, "sensitive data may not be transmitted," "proprietary documents must be encrypted," and/or "archived emails have no restrictions." The DLP policy database may categorize the sensitive data, proprietary document, and/or archived emails from the mobile device as "sensitive data," "no restrictions," and/or "proprietary data." The DLP database may send these categories to the mobile device. The mobile device may tag the sensitive data, proprietary document, and/or archived emails, respectively, as "sensitive," "proprietary," and/or "unrestricted." The mobile device may then enforce the DLP rules "do not transmit," "do not unencrypt," and/or "no restrictions" on the sensitive data, proprietary document, and/or archived emails, respectively, based on the tags.

Returning to FIG. 3, at step 310 one or more of the systems described herein may enforce on the mobile device, based on the data loss prevention policy tag, a data loss prevention rule for the data loss prevention category of the sensitive data. For example, at step 310 enforcing module 112 may, as part of computing device 202 in FIG. 2, enforce on computing device 202, based on DLP policy tag 212, DLP rule 214 for DLP category 210 of sensitive data 208.

Enforcing module 112 may enforce the data loss prevention rule in any suitable manner. For example, enforcing module 112 may enforce a DLP rule on the sensitive data on the mobile device in reaction to a user attempting an action in relation to the data.

In one example, enforcing module 112 may detect that a user may be attempting to email the documents containing credit card information. The smartphone may include a DLP policy which may interpret the tag "identity theft risk" to mean that the documents may not be transmitted, and may enforce a DLP rule preventing the user from emailing the documents.

In one example, enforcing module 112 may detect that a user may be attempting to email the documents containing credit card information. The smartphone may prevent the user from emailing the documents by enforcing a DLP rule based on the tag "do not transmit" on the document.

In some examples, enforcing module 112 may enforce the data loss prevention rule by enforcing the data loss prevention rule when the mobile device may not be connected to the network. For example, a user may attempt to read a file tagged "read disallowed" while not connected to any network. Because the tag may already be in place, systems described herein may not require network access in order to enforce the DLP policy and prevent read access to the file. In some examples, the mobile device may be connected to a network which may not be the network which has access to the DLP policy database. For example, a user may attempt to email a sensitive document while on a public wireless network and may be prevented from doing so based on the tag on the sensitive document.

In some examples, enforcing module 112 may enforce the data loss prevention rule by identifying an attempt to transfer the sensitive data and/or preventing the attempt to transfer the sensitive data. For example, a user may attempt to email a company confidential document from their mobile device. Systems described herein may identify that the document has been tagged as "company confidential," determine that the proper treatment for that tag may involve blocking transfers of the document, and may block the sending of the email. In some examples, enforcing module 112 may enforce the data loss prevention rule without communicating with the data loss prevention policy database after identifying the attempt and before preventing the attempt. In this manner, enforcing module 112 may act on the attempt while minimizing the latency of the transfer attempt, the impact on mobile device performance, and a reliance on the current state of the mobile device (e.g., connectivity to a suitable network).

In some examples, enforcing module 112 may enforce the data loss prevention rule by identifying an attempt to read the sensitive data and/or blocking the attempt to read the sensitive data. For example, a user may attempt to decrypt sensitive data on their mobile device which may have been tagged as "no read allowed." Systems described herein may identify this attempt and may prevent the decryption of the sensitive data based on the tag. In some examples, enforcing module 112 may enforce the data loss prevention rule without communicating with the data loss prevention policy database after identifying the attempt and before preventing the attempt. In this manner, enforcing module 112 may act on the attempt while minimizing the latency of the read attempt, the impact on mobile device performance, and a reliance on the current state of the mobile device.

In some examples, enforcing module 112 may enforce the data loss prevention rule by allowing access to the sensitive data. For example, a user may attempt to open a document which may be tagged as "allow read; disallow transfer." Systems described herein may identify the read attempt and may allow the read attempt based on the tag. In some examples, enforcing module 112 may enforce the data loss prevention rule without communicating with the data loss prevention policy database after identifying the access attempt and before preventing the attempt. In this manner, enforcing module 112 may act on the attempt while minimizing the latency of the access attempt, the impact on mobile device performance, and a reliance on the current state of the mobile device.

In some embodiments, systems described herein may expire the data loss prevention policy tag after a predetermined time span. Examples of a predetermined time span may include one day, one week, and/or one month. Additionally or alternatively, these systems may expire the data loss prevention policy tag by receiving a notification from the data loss prevention policy database that certain tags have expired. In some examples, the systems described herein may replace the expired tags with new tags (e.g., by querying the data loss prevention policy database again). For example, the tag "do not transmit" may be expired and replaced with the tag "transmission allowed" if the DLP policy for the category of sensitive data has changed. In another example, the tag "no risk" may be expired and replaced with the tag "NDA violation risk" if the system used to categorize the sensitive data has been changed to include additional categories and/or recognize more examples of data from existing categories. In one example, the tag "personal contact information" may be expired and not replaced because the data loss prevention database has been updated with a more accurate parsing method for identifying personal contact information in files (and, e.g., the file to which the tag had previously been applied did not contain personal contact information). In some examples, expired tags may be replaced with identical tags.

Figure 5:
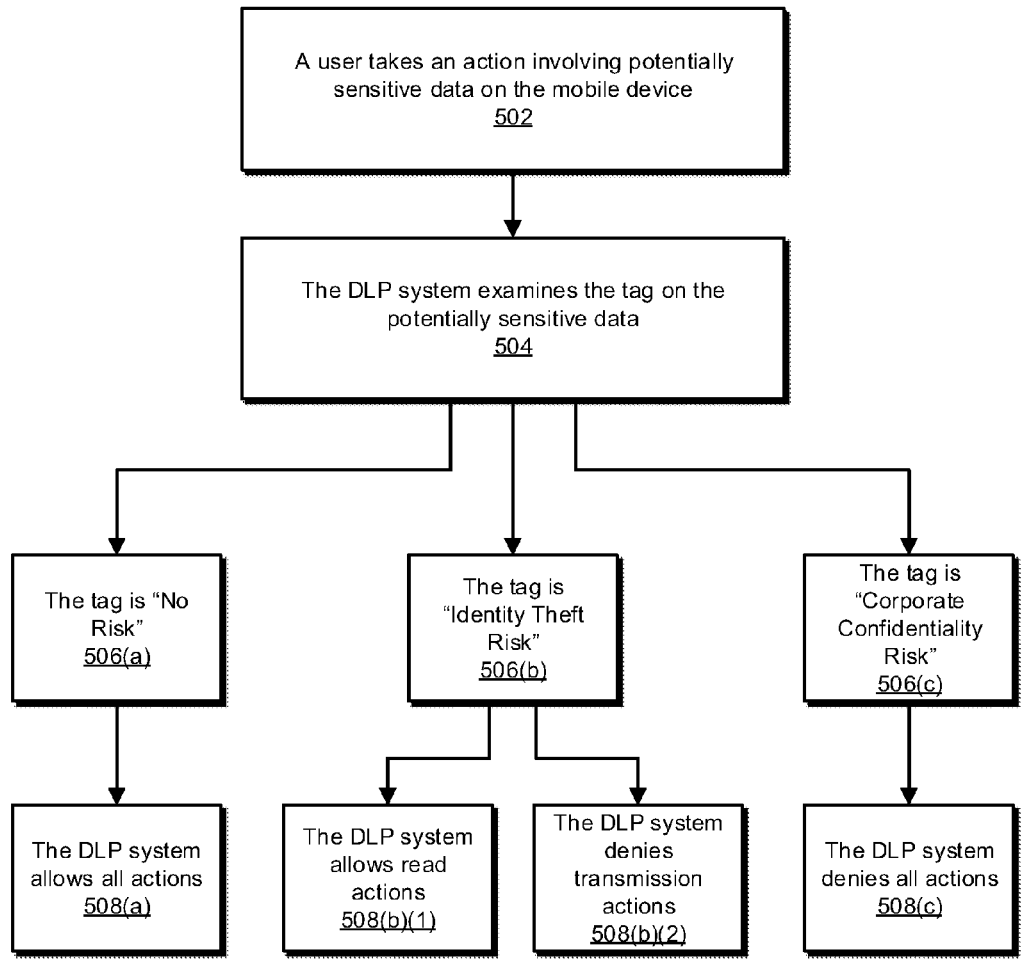
FIG. 5 is a flow diagram of an exemplary system for enforcing data loss prevention policies on mobile devices.

FIG. 5 is a flow diagram of an exemplary method 500 for enforcing data loss prevention policies on mobile devices. Using FIG. 5 as an example, a user may, at step 502, take an action involving potentially sensitive data on a mobile device. At step 504, systems described herein may examine a tag on the potentially sensitive data. In one example, at step 506(a), these systems may determine that the tag describes the data as "no risk." In this example, at step 508(a), these systems may identify a corresponding DLP rule to allow all actions on the data. In one example, at step 506(b), these systems may determine that the tag describes the data as "identity theft risk." In this example, if the action is a read action, at step 508(b)(1) these systems may identify a corresponding DLP rule to allow the action. If the action is a transmission of the sensitive data, at step 508(b)(2) these systems may identify a corresponding DLP rule to block the transaction. In one example, at step 506(c), these systems may determine that the tag describes the data as "corporate confidentiality risk." In this example, at step 508(c), these systems may identify a corresponding DLP rule to deny all actions that may be taken involving the sensitive data.

As explained above in connection with method 300 in FIG. 3, systems described herein may identify a mobile device with sensitive data that may be on a network and in a state designated for DLP analysis. The designated state may include being in the process of charging, which may remove the constraint of limited mobile device batteries. The network may be of a predetermined type, such as a private corporate network. The mobile device may request a DLP category for the sensitive data from a DLP policy database on the network. The DLP policy database may perform an analysis of the sensitive data and send a category for the sensitive data to the mobile device.

The mobile device may tag the sensitive data on the mobile device based on the DLP category received from the DLP database. Systems described herein may enforce, on the mobile device, the DLP policy based on the tags. This may happen at any time after the sensitive data has been tagged, including situations when the mobile device may not be connected to a network. The enforcement of the DLP policy may include blocking and/or allowing reads and/or transfers of the sensitive data, based on the tag. The tag allows for accurate, real-time DLP policy decisions to be made in regard to the sensitive data without requiring the mobile device to be connected to the DLP policy database.

Figure 6:
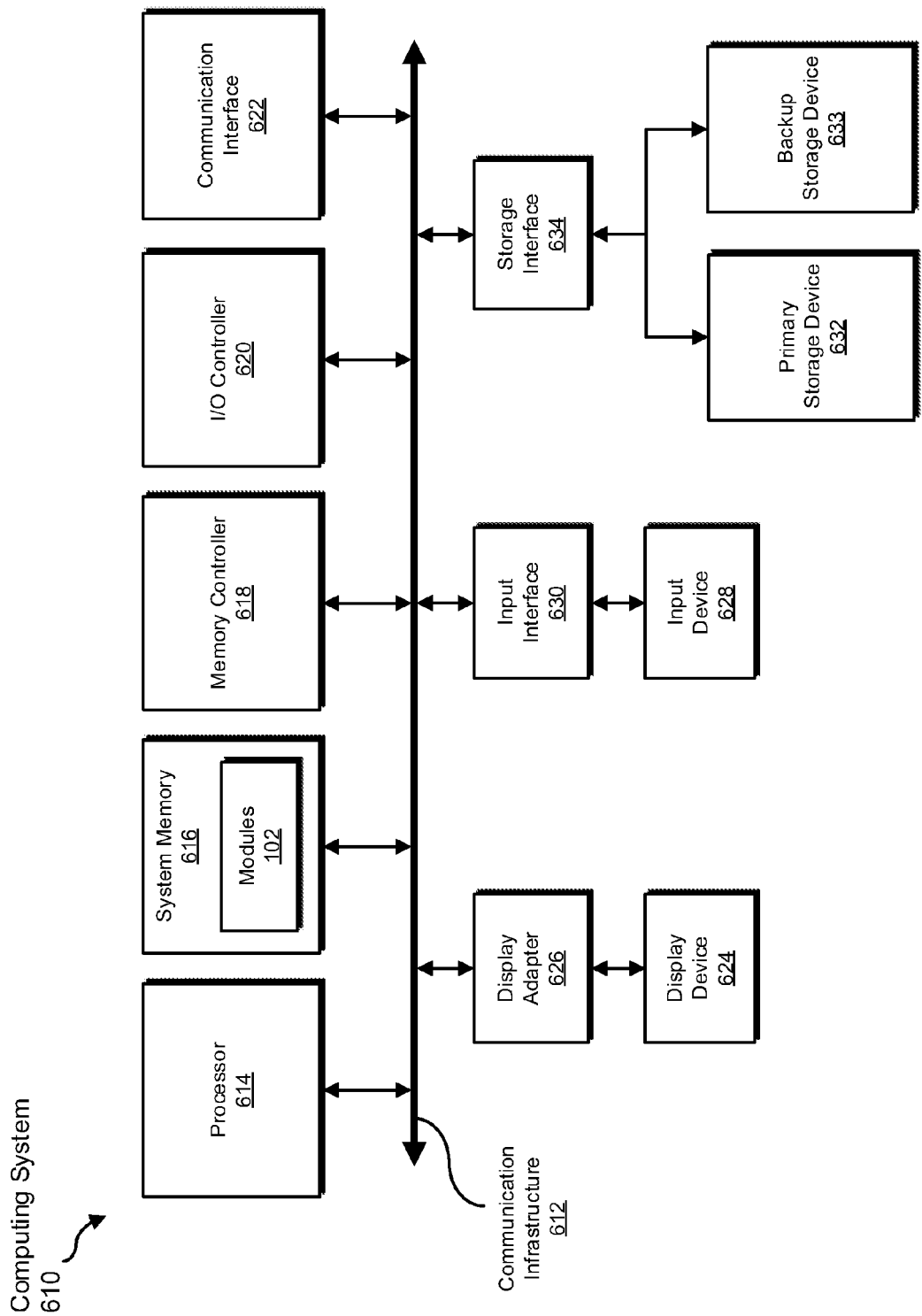
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
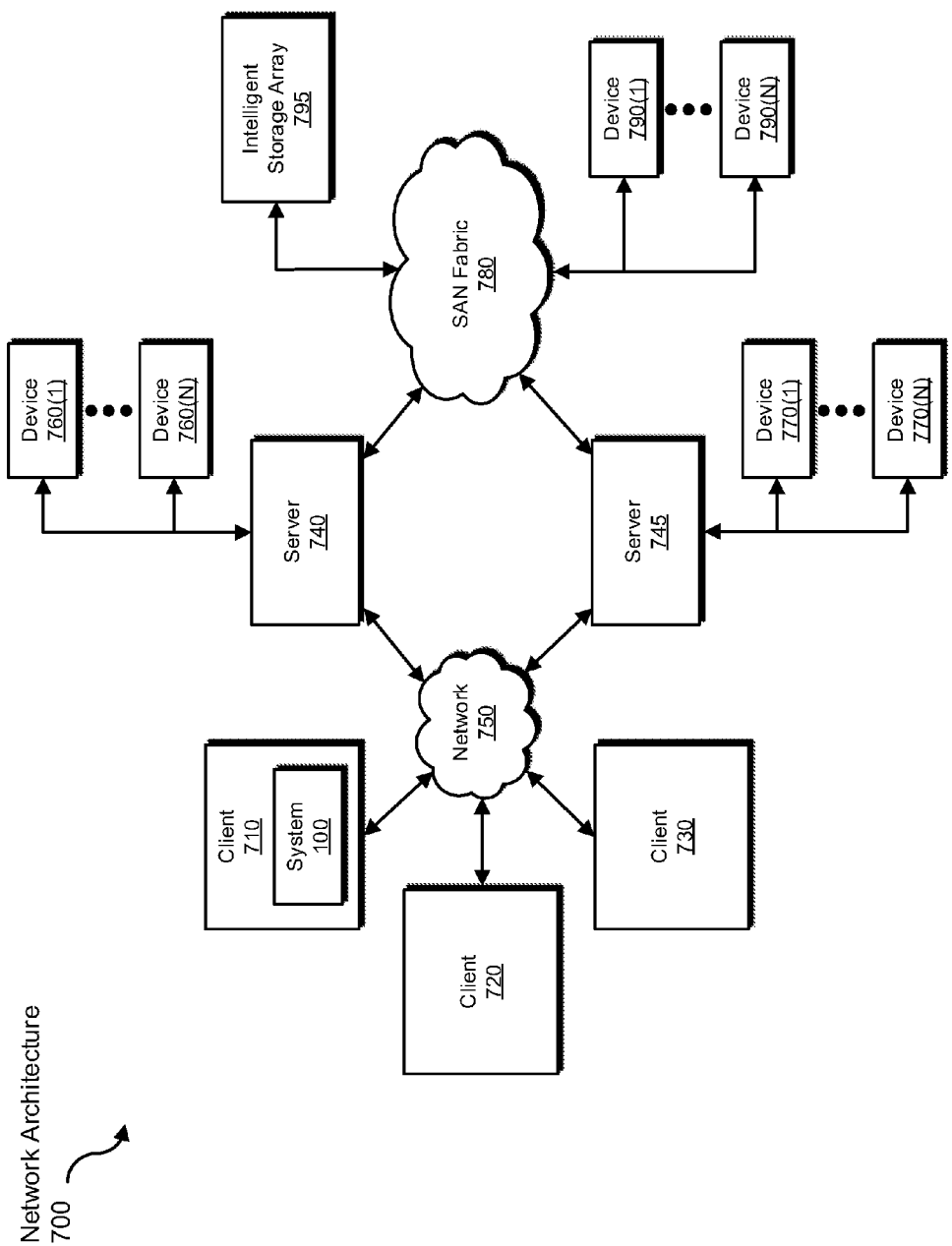
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for enforcing data loss prevention policies on mobile devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive sensitive to be transformed, transform the sensitive data, output a result of the transformation to data loss prevention policy database, use the result of the transformation to categorize the sensitive data, and store the result of the transformation to the data loss prevention policy database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enforcing data loss prevention policies on mobile devices, at least a portion of the method being performed by a computing device comprising at least one processor, the method comprising:
    identifying a mobile device that is connected to a network and that comprises sensitive data and that is in a charging state in which the mobile device draws power from a source other than a primary battery of the mobile device;
    requesting, from a data loss prevention policy database via the network, a data loss prevention policy category for the sensitive data on the mobile device based on an analysis of at least a portion of the sensitive data at the data loss prevention policy database, wherein the data loss prevention policy category indicates a type of risk caused by potential loss of the sensitive data;
    receiving, from the data loss prevention policy database via the network, the data loss prevention policy category for the sensitive data on the mobile device;
    tagging, based on the data loss prevention policy category, the sensitive data on the mobile device with a data loss prevention policy tag;
    determining that the mobile device is no longer connected to the network;
    while the mobile device is not connected to the network, enforcing on the mobile device, based on the data loss prevention policy tag, a data loss prevention rule for the data loss prevention category of the sensitive data without communicating with the data loss prevention policy database.

2. The computer-implemented method of claim 1, further comprising:
    performing, at the data loss prevention policy database, the analysis of the portion of the sensitive data;
    determining, based on the analysis, the data loss prevention policy category for the sensitive data.

3. The computer-implemented method of claim 1, further comprising expiring the data loss prevention policy tag after a predetermined time span.

4. The computer-implemented method of claim 1, wherein the network comprises a predetermined type of network that is designated for transferring data for data loss prevention analysis.

5. The computer-implemented method of claim 1, wherein enforcing the data loss prevention rule comprises:
    identifying an attempt to transfer the sensitive data;
    preventing the attempt to transfer the sensitive data without communicating with the data loss prevention policy database after identifying the attempt and before preventing the attempt.

6. The computer-implemented method of claim 1, wherein enforcing the data loss prevention rule comprises:
    identifying an attempt to read the sensitive data;
    blocking the attempt to read the sensitive data without communicating with the data loss prevention policy database after identifying the attempt and before preventing the attempt.

7. The computer-implemented method of claim 1, wherein enforcing the data loss prevention rule comprises allowing access to the sensitive data.

8. A system for enforcing data loss prevention policies on mobile devices, the system comprising:
    an identification module that identifies a mobile device that is connected to a network and that by sensitive data and that is in a charging state in which the mobile device draws power from a source other than a primary battery of the mobile device;
    a request module that requests, from a data loss prevention policy database via the network, a data loss prevention policy category for the sensitive data on the mobile device based on an analysis of at least a portion of the sensitive data at the data loss prevention policy database, wherein the data loss prevention policy category indicates a type of risk caused by potential loss of the sensitive data;

a receiving module that receives, from the data loss prevention policy database via the network, the data loss prevention policy category for the sensitive data on the mobile device;

a tagging module that tags, based on the data loss prevention policy category, the sensitive data on the mobile device with a data loss prevention policy tag;

an enforcing module that:
  determines that the mobile device is no longer connected to the network;
  while the mobile device is not connected to the network, enforces on the mobile device, based on the data loss prevention policy tag, a data loss prevention rule for the data loss prevention category of the sensitive data without communicating with the data loss prevention policy database;

at least one hardware processor configured to execute the identification module, the request module, the receiving module, the tagging module and the enforcing module.

9. The system of claim 8, further comprising:
a performing module that performs, at the data loss prevention policy database, the analysis of the portion of the sensitive data;
a determination module that determines, based on the analysis, the data loss prevention policy category for the sensitive data;
wherein the hardware processor is further configured to execute the performing module and the determination module.

10. The system of claim 8, further comprising an expiring module that expires the data loss prevention policy tag after a predetermined time span;
wherein the hardware processor is further configured to execute the expiring module.

11. The system of claim 8, wherein the network comprises a predetermined type of network that is designated for transferring data for data loss prevention analysis.

12. The system of claim 8, wherein the enforcing module enforces the data loss prevention rule by:
identifying an attempt to transfer the sensitive data;
preventing the attempt to transfer the sensitive data without communicating with the data loss prevention policy database after identifying the attempt and before preventing the attempt.

13. A non-transitory computer-readable-storage medium comprising one or more computer-readable instructions that, when executed by at least one processor of a computing device, cause the computing device to:
identify a mobile device that is connected to a network and that comprises sensitive data and that is in a charging state in which the mobile device draws power from a source other than a primary battery of the mobile device;
request, from a data loss prevention policy database via the network, a data loss prevention policy category for the sensitive data on the mobile device based on an analysis of at least a portion of the sensitive data at the data loss prevention policy database, wherein the data loss prevention policy category indicates a type of risk caused by potential loss of the sensitive data;
receive, from the data loss prevention policy database via the network, the data loss prevention policy category for the sensitive data on the mobile device;
tag, based on the data loss prevention policy category, the sensitive data on the mobile device with a data loss prevention policy tag;
determine that the mobile device is no longer connected to the network;
while the mobile device is not connected to the network, enforce on the mobile device, based on the data loss prevention policy tag, a data loss prevention rule for the data loss prevention category of the sensitive data without communicating with the data loss prevention policy database.

14. The method of claim 1, wherein the data loss prevention policy category is further based on at least one of:
a data type of the sensitive data;
the data loss prevention rule for the sensitive data.

15. The method of claim 2, wherein performing the analysis of the portion of the sensitive data comprises running a regular expression against the portion of the sensitive data to determine whether the portion of the sensitive data matches the regular expression.

16. The method of claim 2, wherein performing the analysis of the portion of the sensitive data comprises searching the portion of the sensitive data for at least one particular string.

17. The method of claim 1, wherein the portion of the sensitive data comprises at least one of:
a filename of the sensitive data;
a file header of the sensitive data;
a hash of the sensitive data.

18. The method of claim 1, wherein tagging the sensitive data with the data loss prevention policy tag comprises tagging the sensitive data with a tag that is different than the data loss prevention policy category.

19. The method of claim 1, wherein the type of risk caused by potential loss of the sensitive data comprises at least one of:
identity theft;
fraud;
corporate espionage;
a breach of confidentiality.

20. The method of claim 4, wherein the predetermined type of network that is designated for transferring data for data loss prevention analysis comprises at least one of:
a local network;
a non-mobile network;
a network with a large bandwidth.

* * * * *